United States Patent [19]

Chen

[11] Patent Number: 5,307,255
[45] Date of Patent: Apr. 26, 1994

[54] PORTABLE IMPROVED STRUCTURE OF QUARTZ LAMP

[76] Inventor: Chi-Lin Chen, P.O. Box 80-20, Taipei, Taiwan

[21] Appl. No.: 12,384

[22] Filed: Feb. 2, 1993

[51] Int. Cl.⁵ .............................................. F21V 21/06
[52] U.S. Cl. ................................... 362/410; 362/295; 362/431; 362/457
[58] Field of Search ............ 362/295, 238, 410, 411, 362/431, 457, 399, 418, 427, 382; 248/188, 188.7, 121

[56] References Cited

U.S. PATENT DOCUMENTS

| | | | |
|---|---|---|---|
| 1,697,710 | 1/1929 | Bostroem | 362/410 |
| 4,428,037 | 1/1984 | Cardoza et al. | 362/431 |
| 5,142,464 | 8/1992 | Wang | 362/295 |
| 5,205,645 | 4/1993 | Lee | 362/431 |

Primary Examiner—Ira S. Lazarus
Assistant Examiner—L. Heyman
Attorney, Agent, or Firm—Pro-Techtor International

[57] ABSTRACT

An improved structure of portable quartz lamp with a lamp housing having a handle and a central post therebeneath, which has between a stand and the central post a connecting piece having a hollowed interior and has an upper and a lower axial pipe portions, the upper one is threadably connected with the central post, and the lower one has its bottom end supported on a top surface of the stand and connected with a bolt thereunder; power conductors are connected in such a way that they will not be tangled with one another when in adjustment of light intensity; the rear surface of the connecting piece has a case for shielding the adjusting mechanism; the adjustment can therefore be effected unafraid of rain infiltration.

1 Claim, 13 Drawing Sheets

PRIOR ART
FIG. 1

PRIOR ART

FIG. 2

PRIOR ART

PORTABLE IMPROVED STRUCTURE OF QUARTZ LAMP

BACKGROUND OF THE INVENTION

The present invention concerns an improved structure of quartz lamp, and especially concerns one which can resolve the tangling problem of the conductors in swivelling movement of a portable quartz lamp.

Portable quartz floodlights have been widely used due to their extremely bright light source they are provided. Such floodlights enable a consumer to extend the daylight activities such as ball games, camping, laquering, and outdoor working, into the night time, they are therefore convenient for use.

Figure 1:
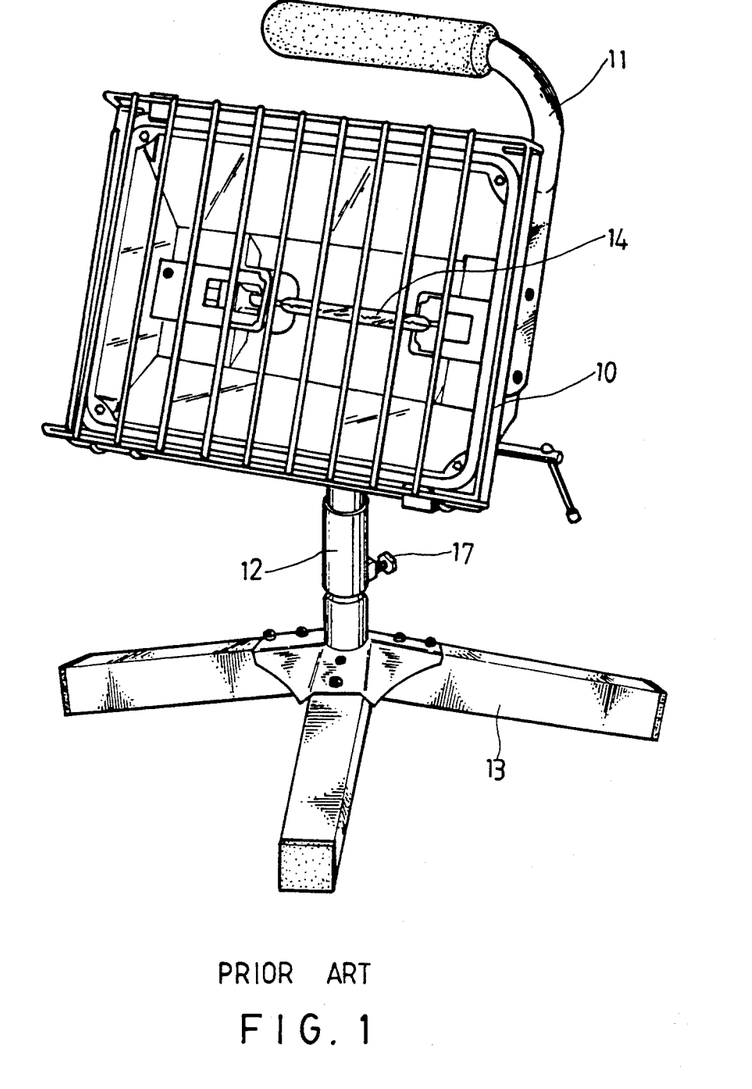
FIG. 1 is a perspective view of a conventional portable quartz lamp.
Figure 2:
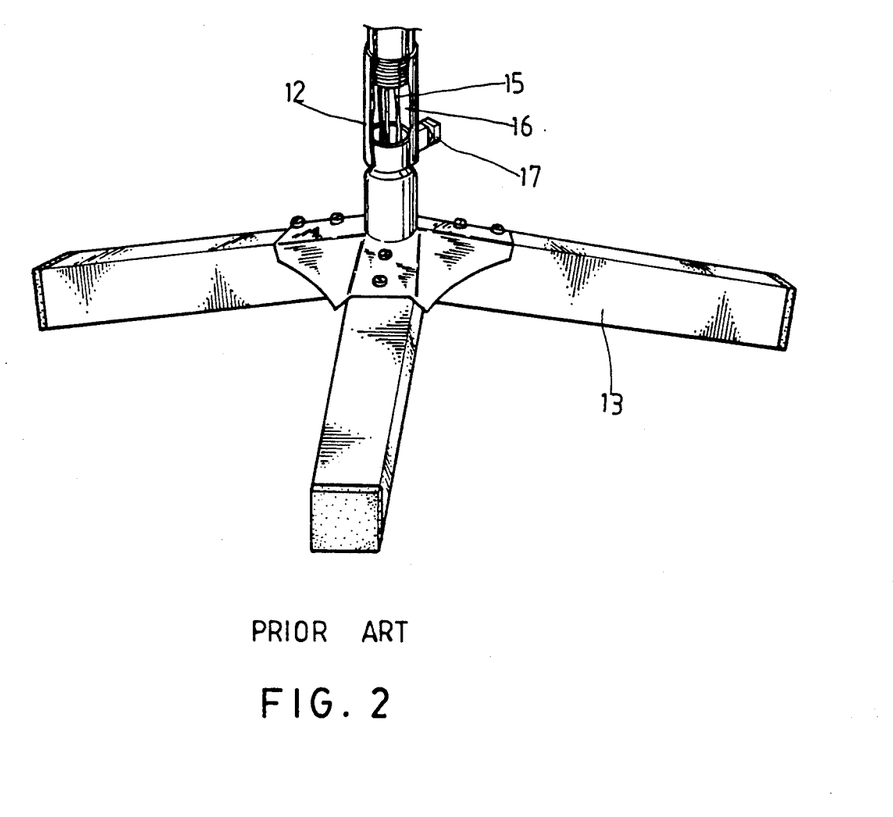
FIG. 2 is a broken away diagram of the axle sleeve and the stand of FIG. 1.

Such a portable quartz floodlight generally has a stand and a handle for carrying with hand. A plurality of conductors of the internal lamp pipe pierces through a hollowed axle sleeve between the stand and the lamp housing. The internal conductors are often tangled with one another due to the swivelling of the lamp for adjusting the lightening direction thereof, and some times can be broken to create danger. Now some drawings are cited to manifest the structure of such a conventional portable quartz lamp:

As shown in FIG. 1, a conventional portable quartz lamp includes generally a housing 10 having a handle 11 provided on one side surface thereof, also includes a hollowed axle sleeve 12 and a stand 13. A plurality of conductors 15 piercing through the hollowed cavity 16 of the axle sleeve 12 for lightening the lamp pipe 14 within the lamp housing 16, such as shown in FIG. 2.

Figure 3:
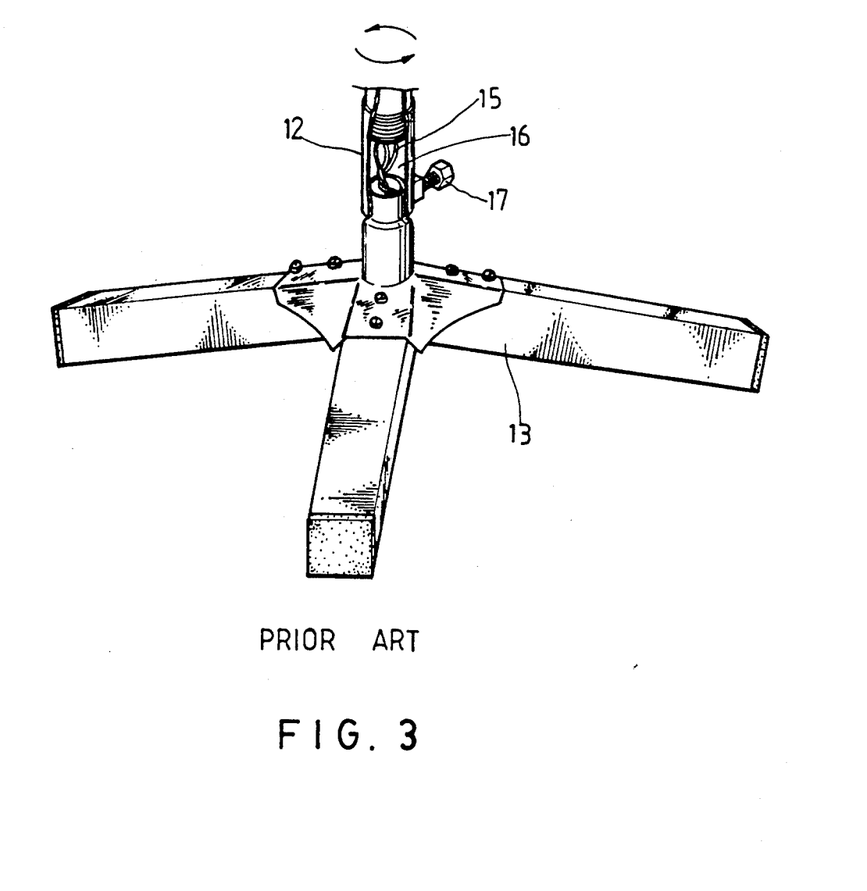
FIG. 3 is similar to FIG. 2, showing the interior conductors are tangled with one another due to the swivelling action.

The structure of the conductors 15 and the related axle sleeve 12 is subjected to tangling when the lamp housing 10 is to be adjusted in its lightening direction. This is due to the fact that a fixed bolt 17 must be loosened when it is desired to adjust the lightening direction, then the housing 10 can be swivelled along with the axle sleeve 12; while such a swivelling movement often render the conductors 15 to tangle with one another as shown in FIG. 3, and even to be broken when the swivelling is overdone, and may create an accident, thus is undesired.

Further, the conventional portable quartz floodlights are sometimes used as a decorative projecting lamp in a courtyard, the light emitted therefrom always needs adjustment in its intensity. However, the conventional portable quartz lamps all use the simple on/off switches to prevent from the infiltration of rain, thus its light can not be adjusted in intensity, this is not convenient.

SUMMARY OF THE INVENTION

The primary object of the present invention is therefore to provide an improved structure of quartz lamp, it includes primarily a connecting piece between the supporting post of the lamp housing and the stand, the upper end of the connecting piece is connected to the housing post, while the bottom end thereof is coupled through a threaded portion with the upper surface of the stand; one polar line of the power lines is connected to an polar line of the lamp pipe within the connecting piece, while another polar line of the power lines is connected through the interior of the connecting piece to an outside control switch together with an polar line of the lamp pipe similarly led to the outside, so that only the outside power lines can be affected by the swivelling action when the portable quartz lamp rotate to adjust the lightening direction, and therefore the tangling phenomenon can be avoided.

Another object of the present invention is to allow one or more than one lamp housings to be installed on one stand.

A further object of the present invention is to provide a water proofing light intensity adjustor for portable quartz lamp, wherein the switching button of the adjustor is located in the case, such that the light intensity can be adjusted while meantime the water proofing ability can be assured.

Other objects, features as well as functions of the present invention will be apparent from the following description of the preferred embodiments thereof in referring to the accompanying drawings.

DETAILED DESCRIPTION OF THE PREFERRED EMBODIMENTS

Figure 4:
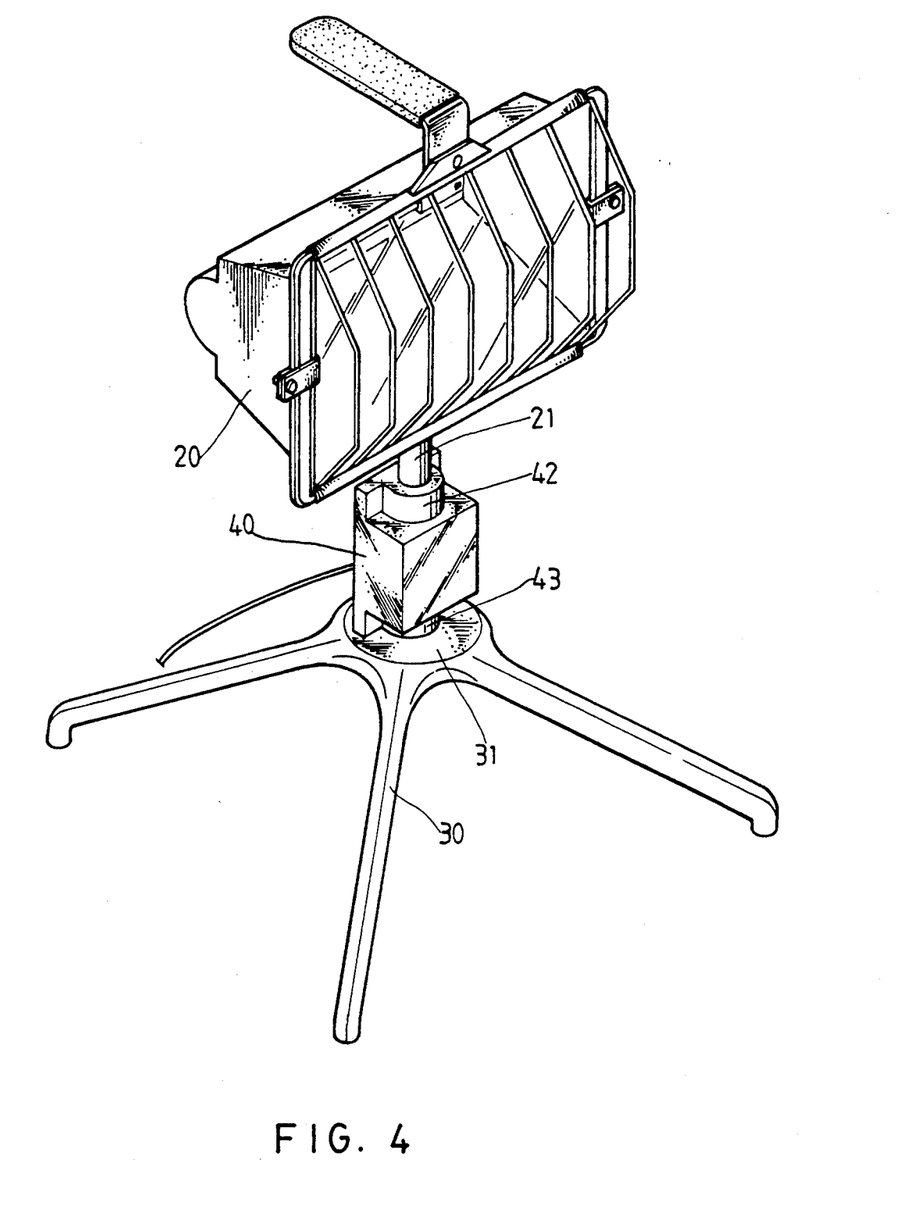
FIG. 4 is a perspective view of an embodiment of the present invention.

Referring to FIG. 4, there is also provided in the present invention with a lamp housing 20 having a handle, on the bottom end of the housing 20 is a central post 21. And a connecting piece 40 is provided between a lower stand 30 and the post 21.

Figure 5:
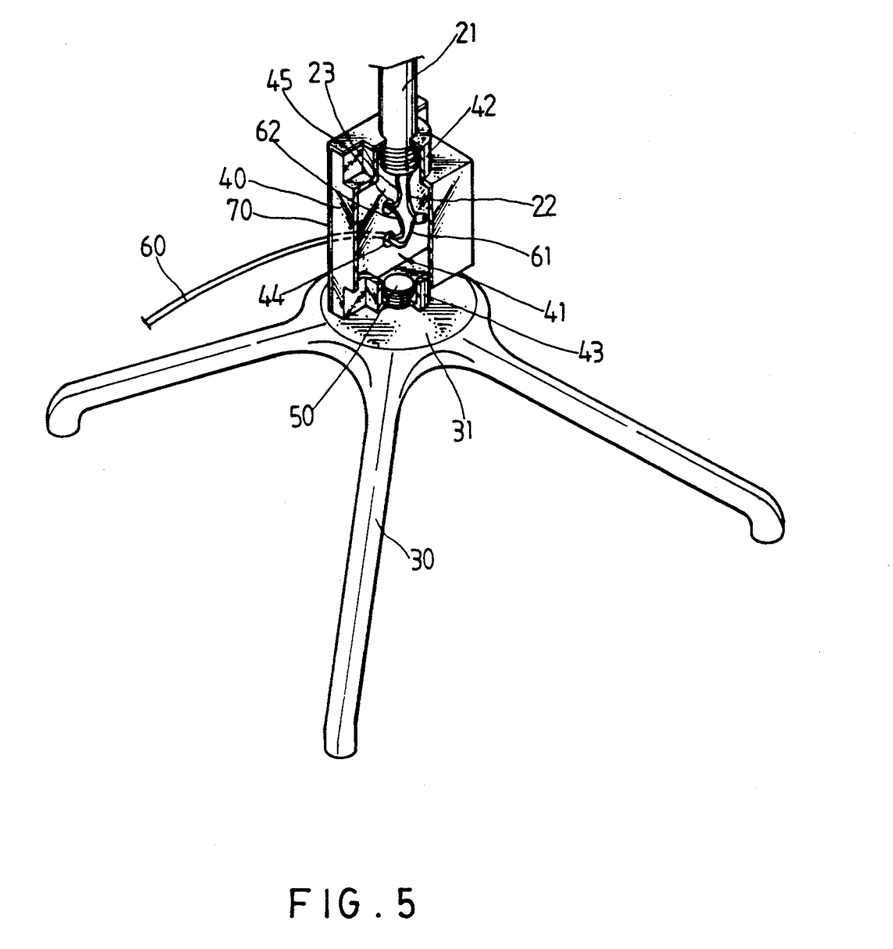
FIG. 5 is a broken away diagram of partial elements of FIG. 4.
Figure 6:
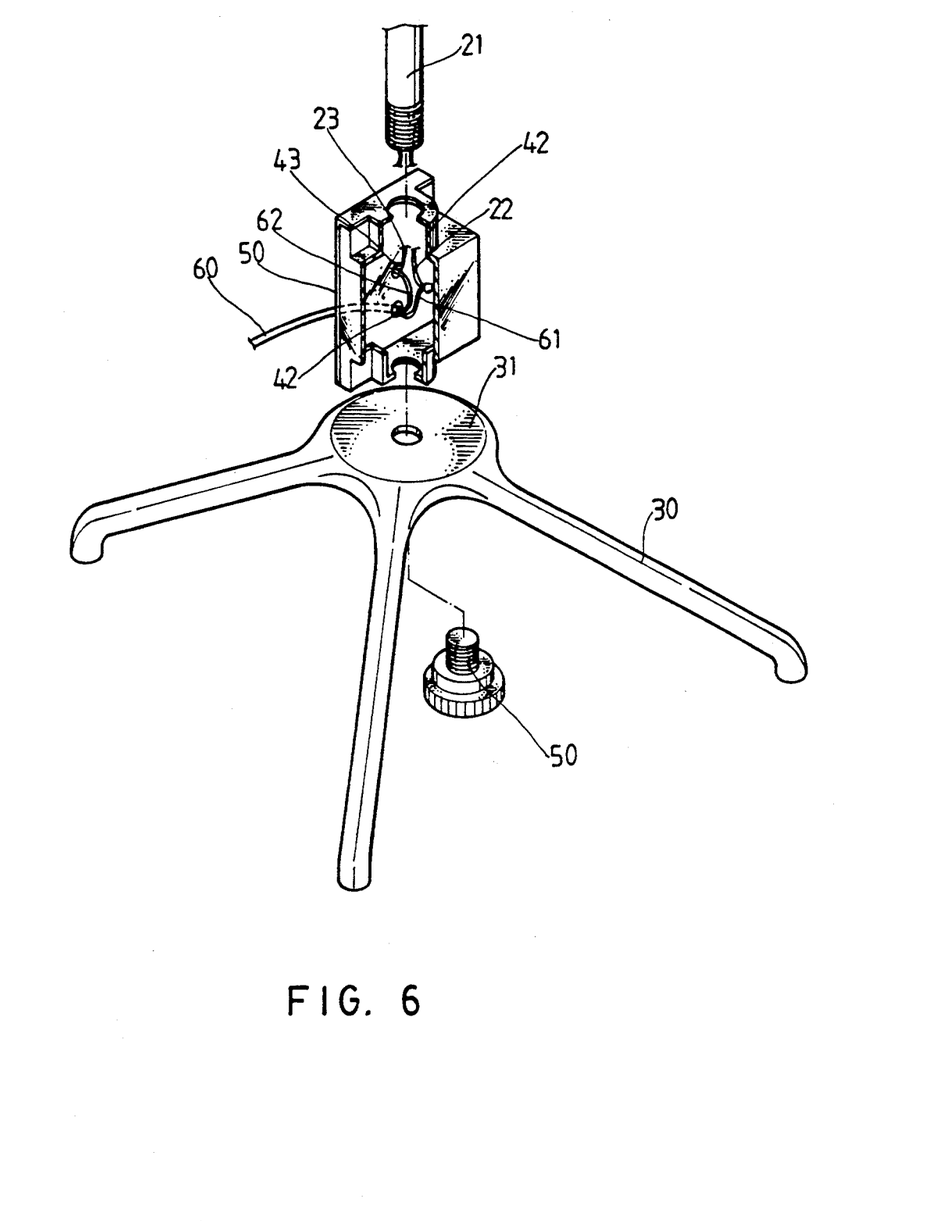
FIG. 6 is an analytic view of partial elements of FIG. 5.

Referring together to FIG. 5 and 6, the connecting piece 40 has a hollowed interior 41 of suitable size and an upper axial connecting pipe portion 42 and a lower axial connecting pipe portion 43. The upper axial connecting pipe portion 42 is threadably connected to the lamp housing post 21, while the bottom end face of the lower axial connecting pipe portion 43 is supported on a top surface of the stand 30. A bolt 50 can be threadably connected to the lower axial connecting pipe portion 43.

Figure 7:
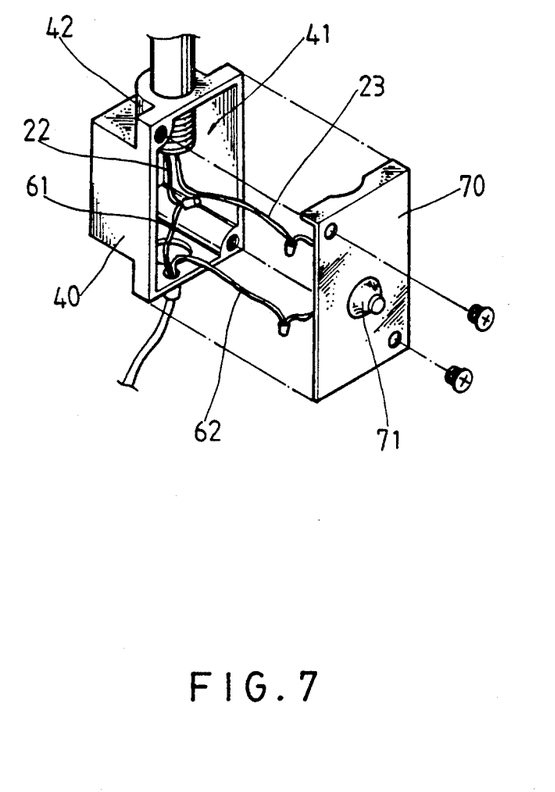
FIG. 7 is an analytic rear view of the connecting piece of the present invention.

One polar line 61 of the power conductors 60 is extended into the hollowed interior 41 of the connecting piece 40 through a hole 44 of the connecting piece 40, and is connected with a polar line 22 of the lamp pipe (light source); the other polar line 62 of the power conductors 60 gets through the another hole 45 of the connecting piece 40 to connect with the other polar line 23 of the lamp pipe to an outside control switch 71. As shown in FIG. 7, the connecting piece 40 can have a panel 70 assembled on the rear surface thereof, the panel 70 is provided with the control switch 71. The other polar lines 62, 63 of the conductors 60 and the lamp pipe can be connected separately to the control switch 71 after passing through the hole 45.

When it is desired to adjust the lightening direction of the light source of the present invention, the bolt 50 shall be rotated to a loose condition, then the lamp housing 20 and the connecting piece 40 can be rotated to adjust the lightening direction. While in the adjust procedure, the interior conductors will not be twisted, and only the outside power conductors 60 swivel hereby, so that the disadvantage of tangling can be effectively avoided.

Figure 8:
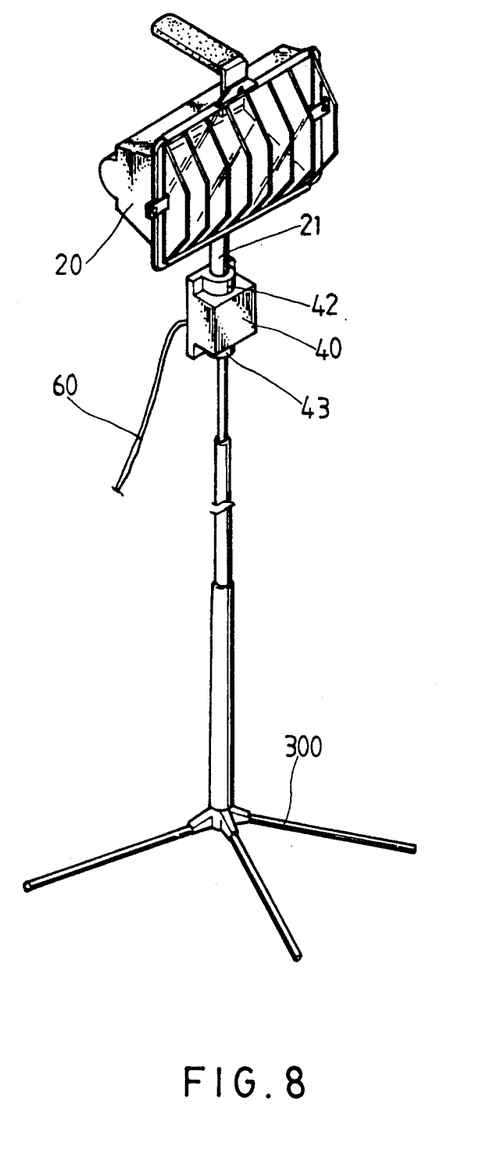
FIG. 8 is a schematic view of the present invention when used on a high stand.
Figure 9:
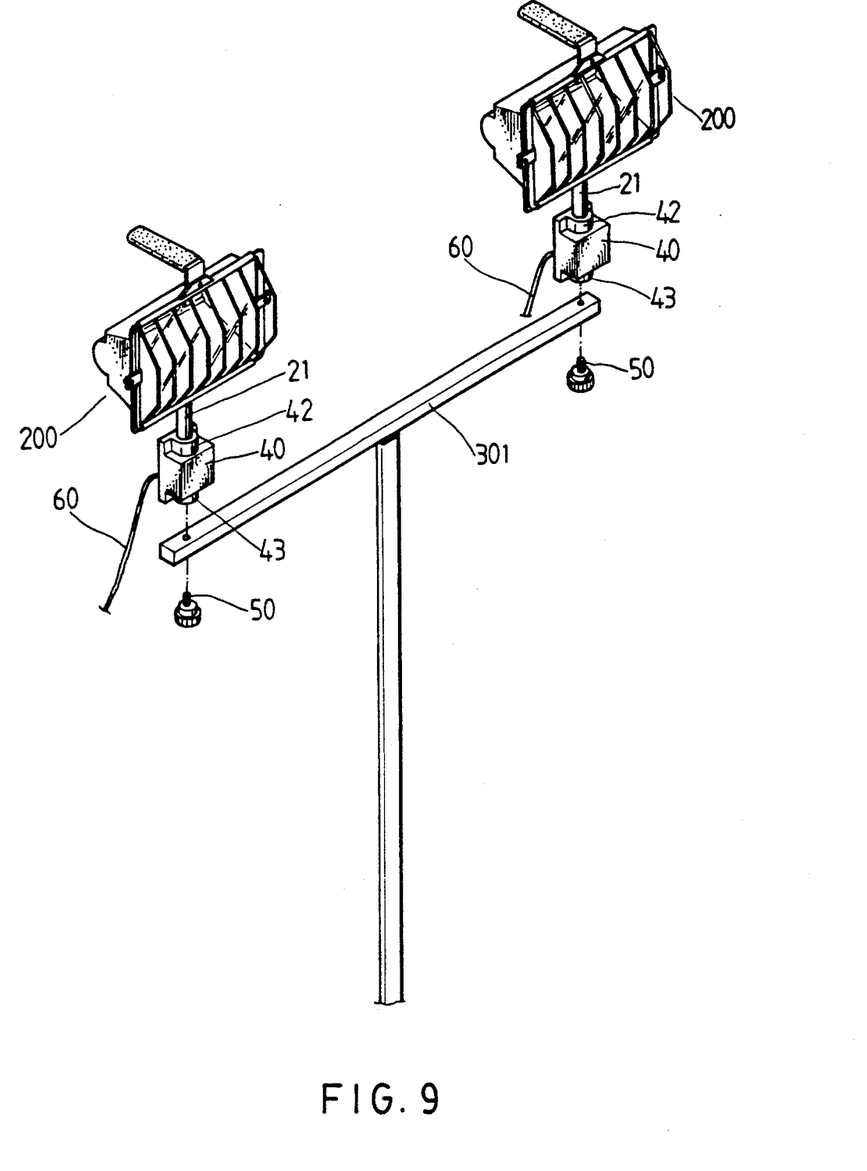
FIG. 9 is a schematic view of the present invention when used on another stand.

As shown in FIG. 8, when a high stand 300 is used, the lamp housing 20 and the connecting piece 40 can be installed on the top end of the stand 300 for lightening on a higher position. And as shown in FIG. 9, a horizontal rod 301 is provided on the stand 300 for supporting a plurality of quartz lamps 200.

Figure 10:
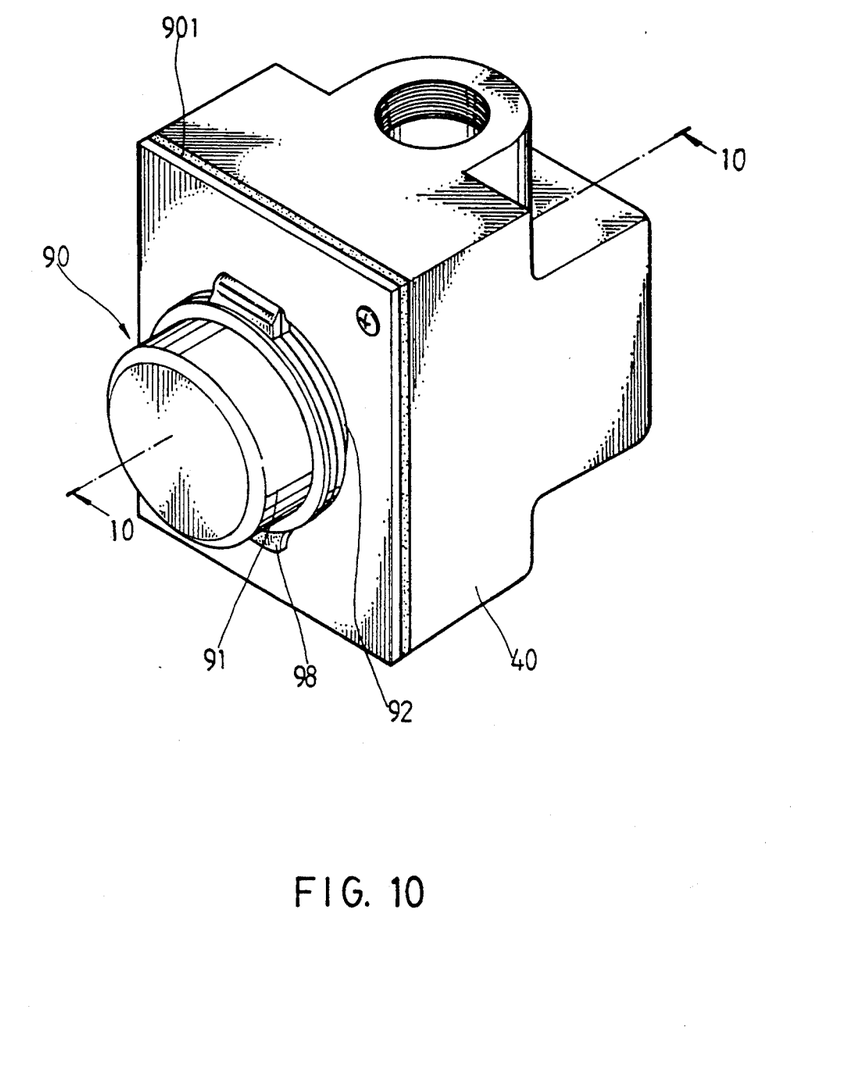
FIG. 10 is a schematic view of the present invention wherein the connecting piece thereof is installed with a water proofing light intensity adjustor.
Figure 11:
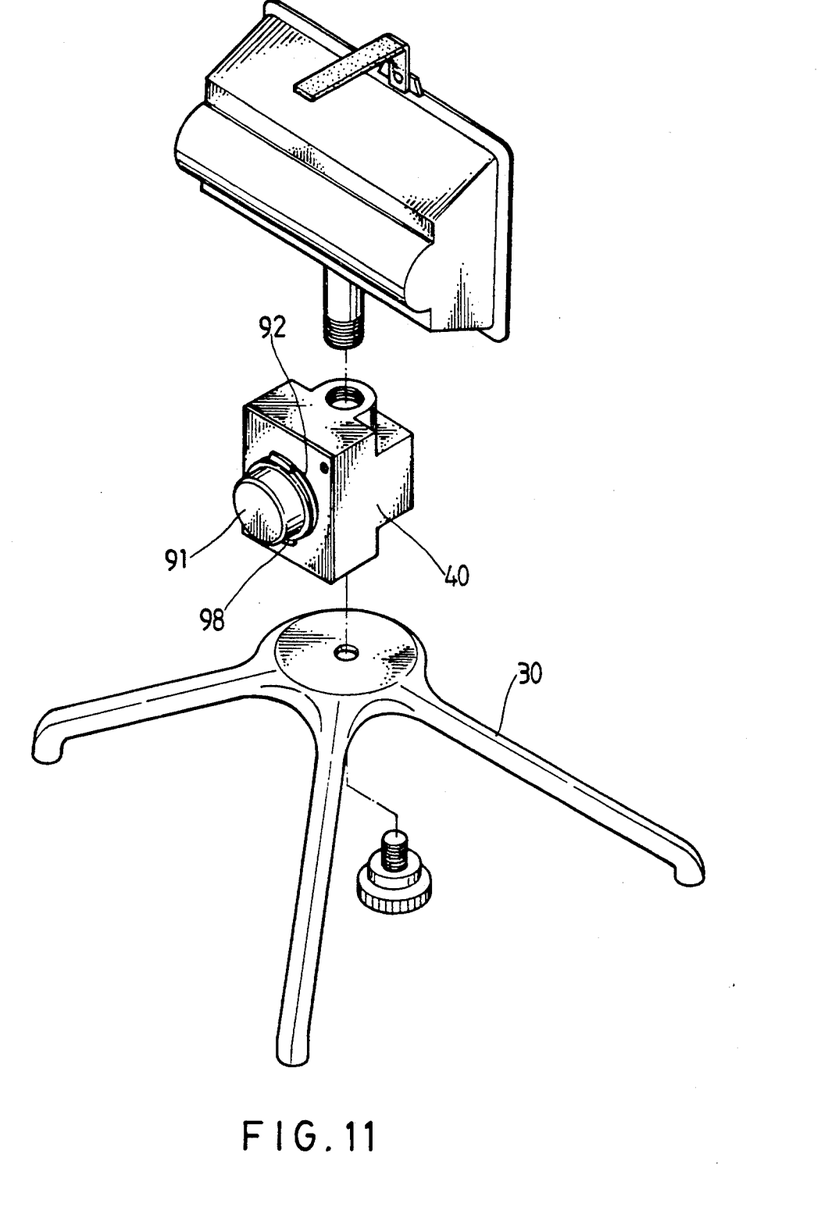
FIG. 11 is a schematic view showing the embodiment of FIG. 10 is installed on a quartz lamp.

Referring to FIG. 10, the rear surface of the connecting piece 40 can be provided with a case 90 having an outside lid 91 and an inside lid 92. And as shown in FIG. 11, the connecting piece 40 can be connected on the upper end thereof to the lamp housing 20 and on the lower end thereof to the stand 30.

Figure 12:
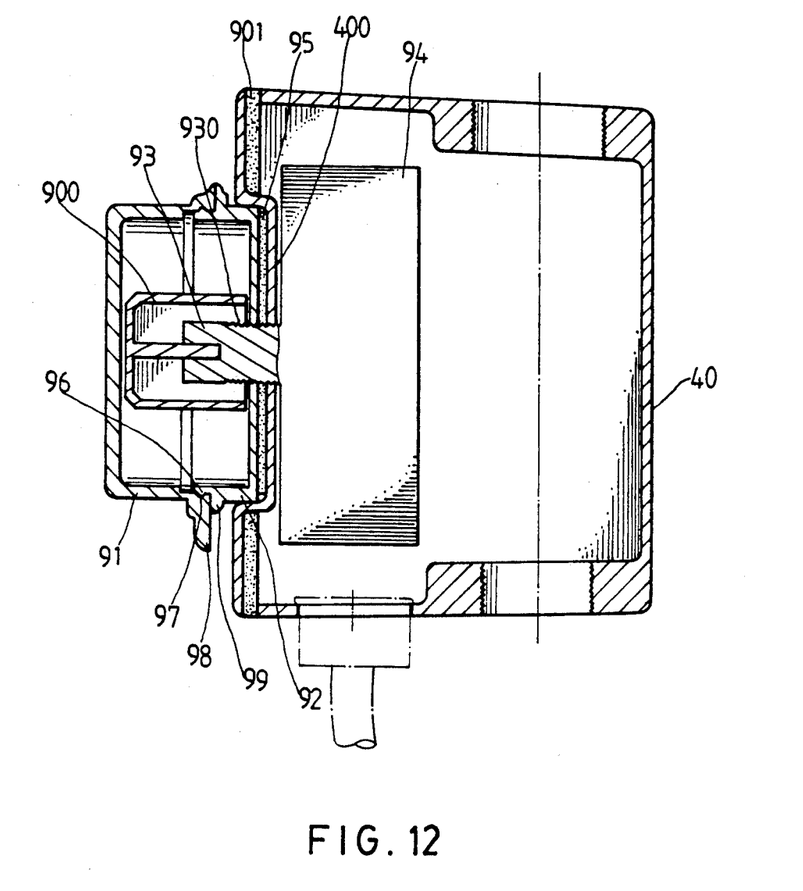
FIG. 12 is a sectional view taken from the sectional line A—A in FIG. 10.

Now referring to FIG. 12, the connecting piece 40 has a recess 400 on the rear surface thereof, and there is a light intensity control stud 93 extending outwardly from an interior wiring device 94. The inside lid 92 can be threadably connected to and about the threaded portion 930 of the control stud 93, a water proof gasket 95 is interposed between the right side surface thereof and the recess 400.

The outside lid 91 and the inside lid 92 have at their removable connection area respectively a flange 96 and a groove 97 being able of locking together, the upper lid 91 has on its end a protruding tong 98, while the inside lid 92 has an abutting flange 99 at a corresponding position.

The outer end of the control stud 93 can be connected to a light intensity switching button 900, the whole light intensity adjusting device is shielded within the case 90. If the panel of the connecting piece 40 is a separated one, a water proof sheet 901 can be located between the panel and the connecting piece 40.

Figure 13:
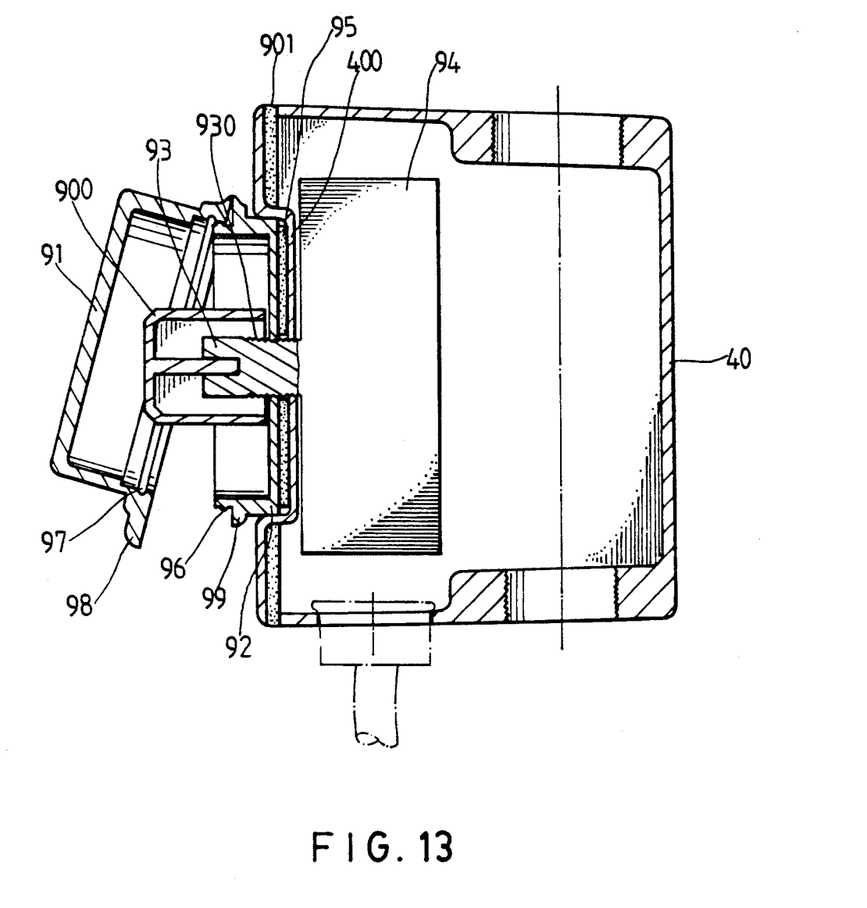
FIG. 13 is similar to FIG. 12, showing an upper lid of a case is opened to reveal a switching button for light intensity adjustment.

When the light intensity adjusting mechanism is not in use normally, rain can be prevented from infiltration by the gasket 95 provided between the inside lid 92 and the connecting piece 40. While the lamp needs an intensity adjustment, the outside lid 91 can be opened (as shown in FIG. 13) by force exerted on the tong 98 of the outside lid 91 with its upper connecting position as a support, then the user can adjust the intensity of light by rotating the switching button 900.

The portable quartz floodlight can have the intensity adjustor installed conveniently due to the provision of the case having an internal space at the switch position of the connecting piece, and the floodlight can be used either in a fine or a raining day.

Due to the fact that there is a connecting piece 40 between the lamp housing 20 and the stand 30, and the conductors 60 can be inserted into the interior of the connecting piece 40 to connect respectively with the electric lines of the light source, so that only the outside power conductors can swivel according to the rotating action of the lamp in adjusting the lightening direction; the tangling problem resides in the conventional quartz lamp can be effectively resolved; further, a water proof adjustor can be installed to adjust the light intensity; the invention is therefore really a practical improvement.

While various changes may be made in the detailed construction, it is understood that such changes will be within the spirit and scope of the present invention.

I claim:

1. An improved structure for a portable quartz lamp comprising:

a lamp housing having a handle and a central post on a bottom of said housing, wherein a connecting piece is provided between a stand and said central post, said connecting piece having a hollowed interior and having an upper axial connecting portion and a lower axial connecting portion, said upper connecting portion being connected via a threaded portion to said central post, and said lower axial portion having a bottom end supported on a top surface of said stand, said lower axial portion being attached to said top surface of said stand by a bolt that is tightened when desired to fix the stand in place;

said connecting piece including a hole through which two polar lines of a power source pass—a first polar line of said two polar lines connects with a first polar line of a light source, and a second polar line of said two polar lines which communicates with an outside control switch; and wherein a rear surface of said connecting piece is provided with a hollowed case including an outer lid and an inner lid, said connecting piece including a control stud extending outward, said inner lid being connected to said control stud, a waterproof gasket being interposed between a recess provided on the rear surface of said connecting piece and said inner lid, said outer lid being removably connected with said inner lid via a flange and a groove, said outer lid opening to uncover a switch that adjusts the light intensity of the lamp, said outer lid shielding said switch when said lid is closed.

* * * * *